Dec. 20, 1955
S. R. JOHNSON
2,727,740
BOWED SHEET ADVANCING MEANS
Filed Aug. 2, 1949
11 Sheets-Sheet 4
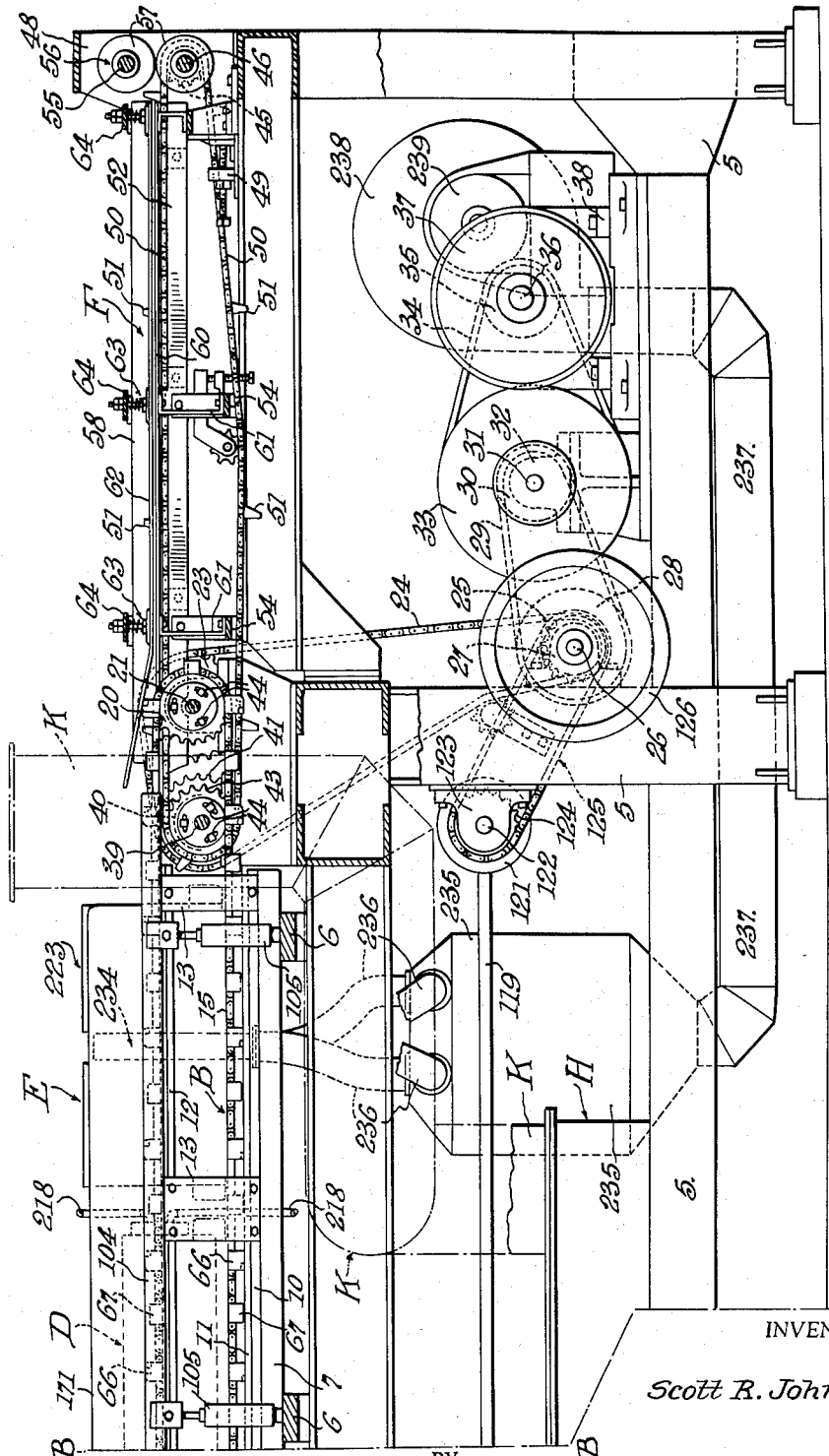
INVENTOR
Scott R. Johnson
BY Mason, Porter, Diller & Stewart
ATTORNEYS

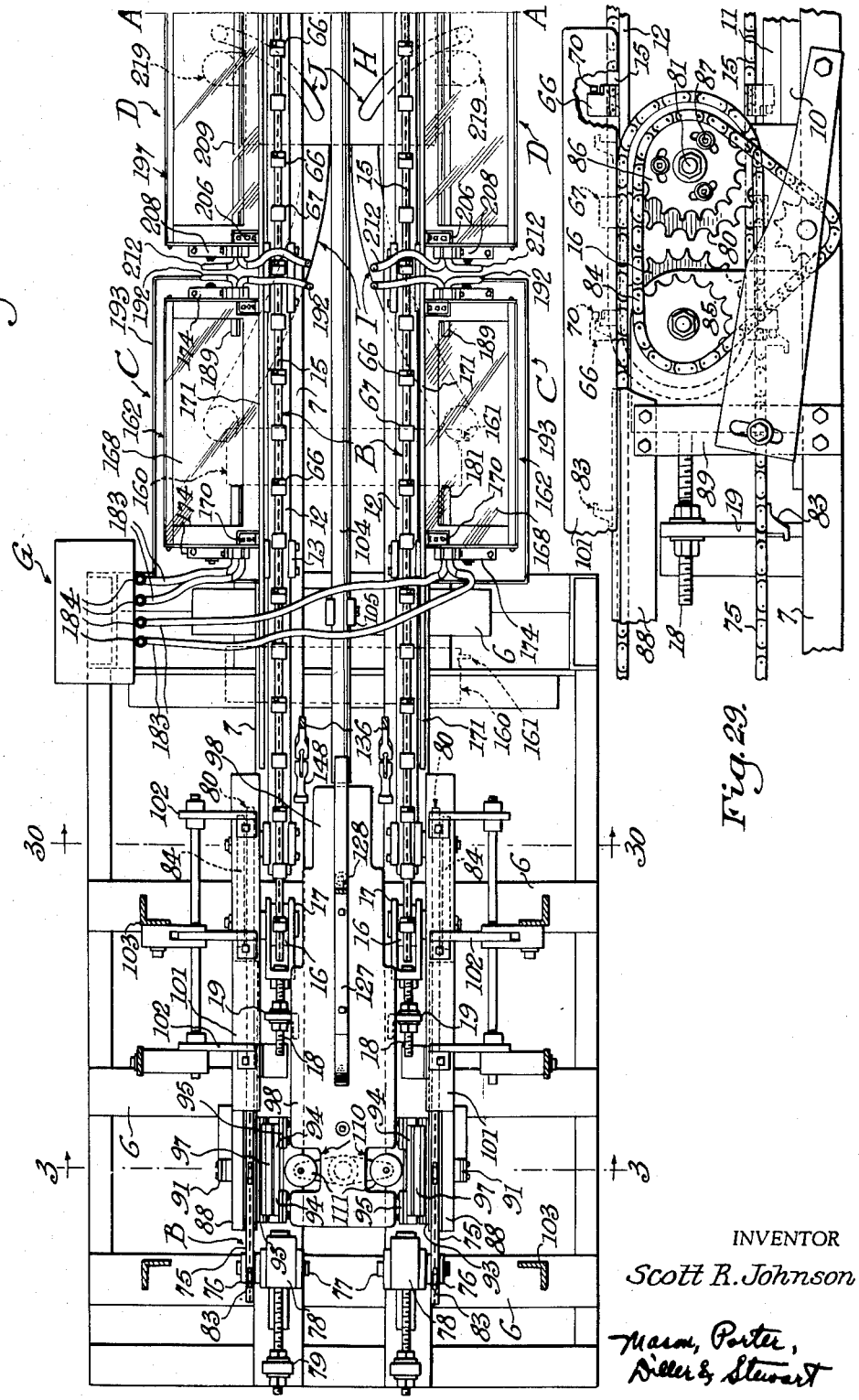
Dec. 20, 1955  S. R. JOHNSON  2,727,740
BOWED SHEET ADVANCING MEANS
Filed Aug. 2, 1949  11 Sheets-Sheet 1
INVENTOR
Scott R. Johnson
ATTORNEYS

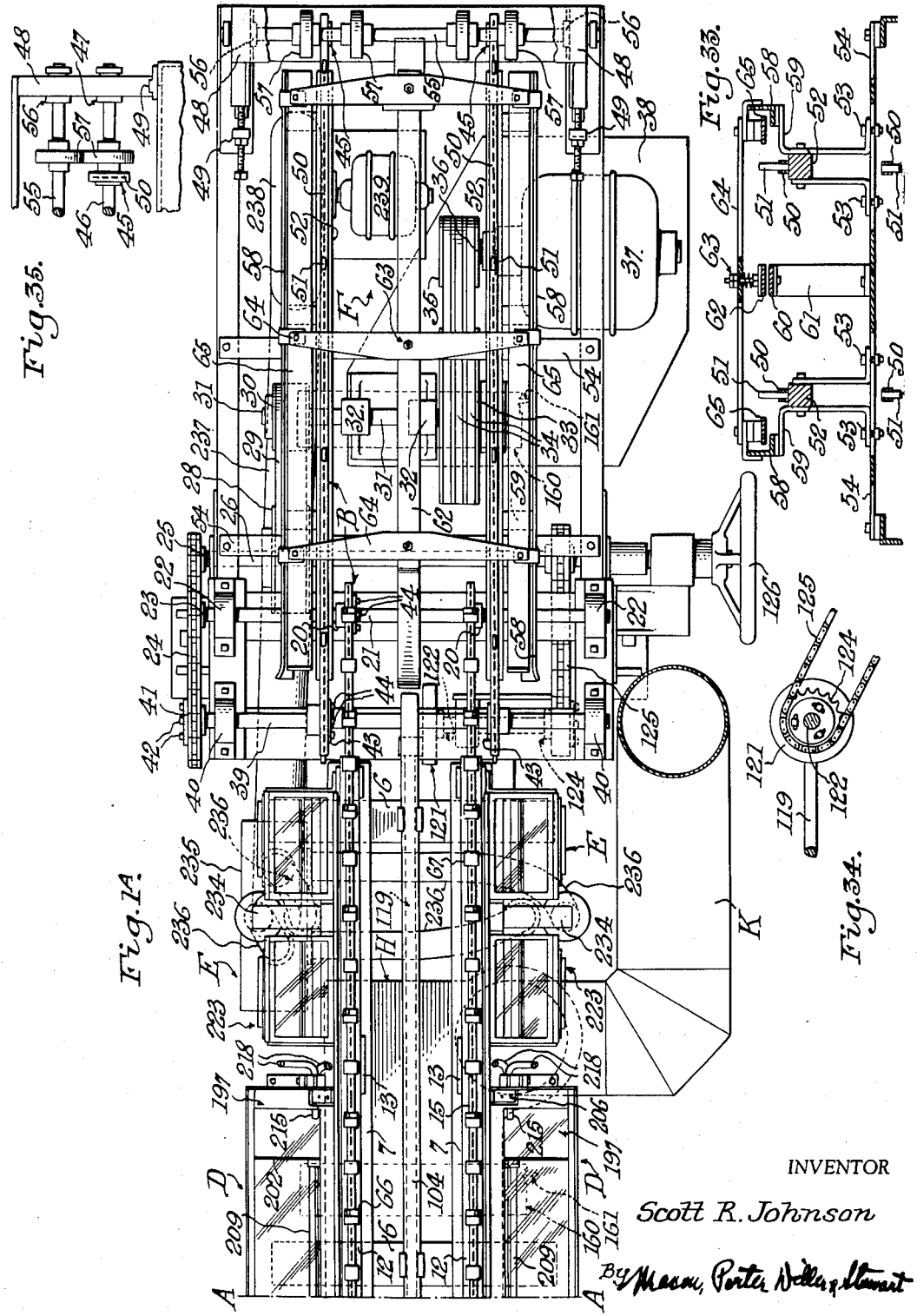

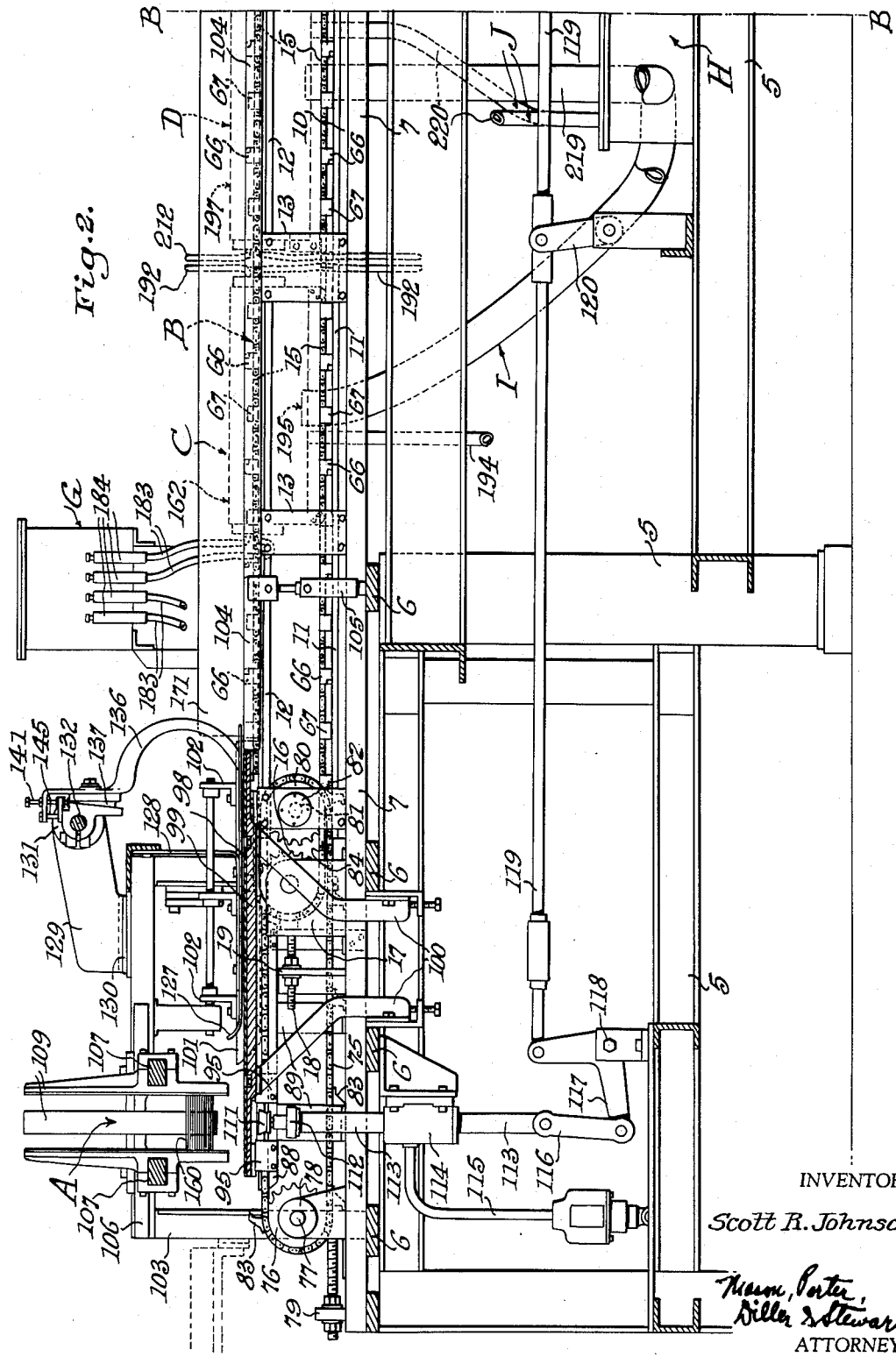

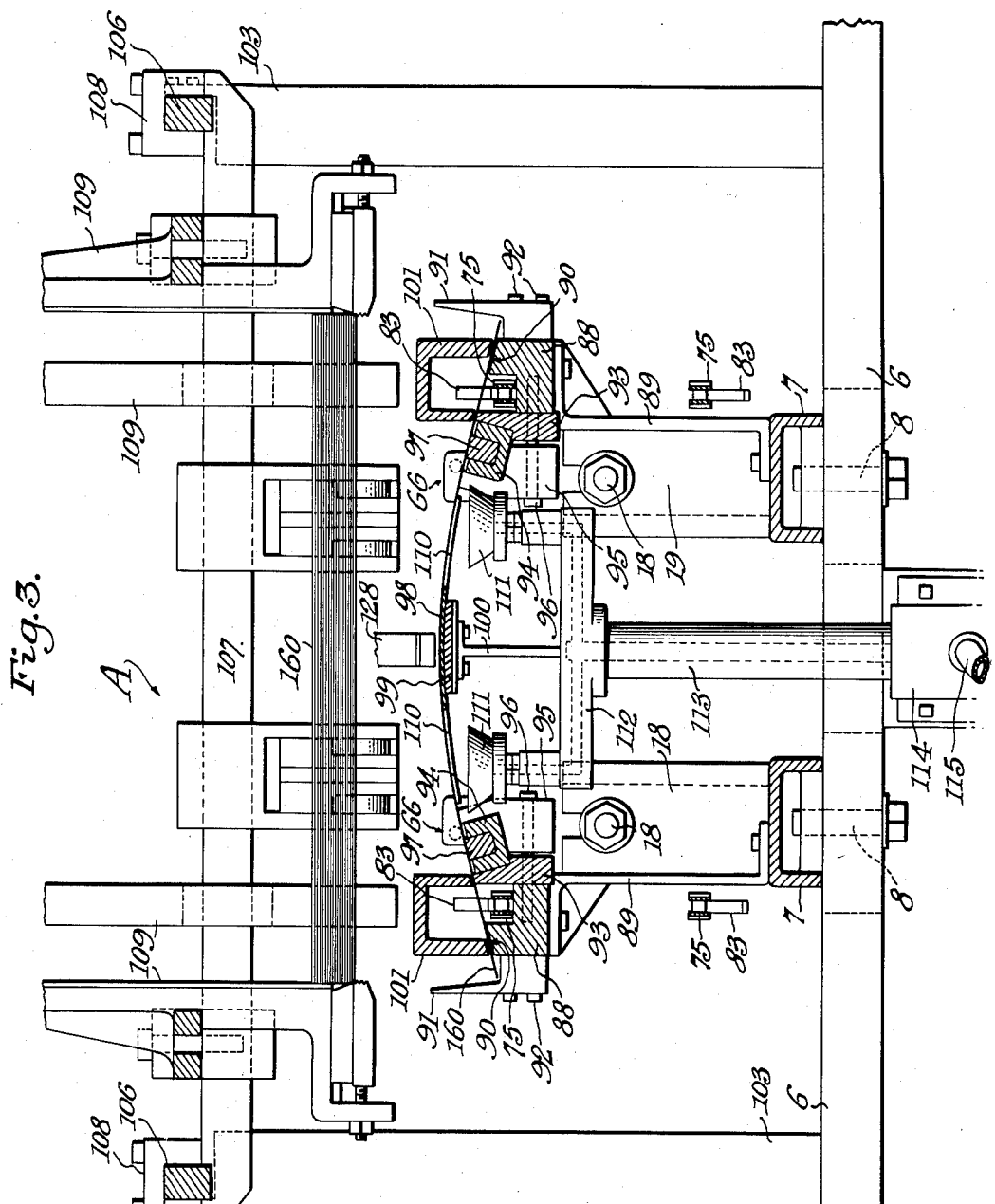

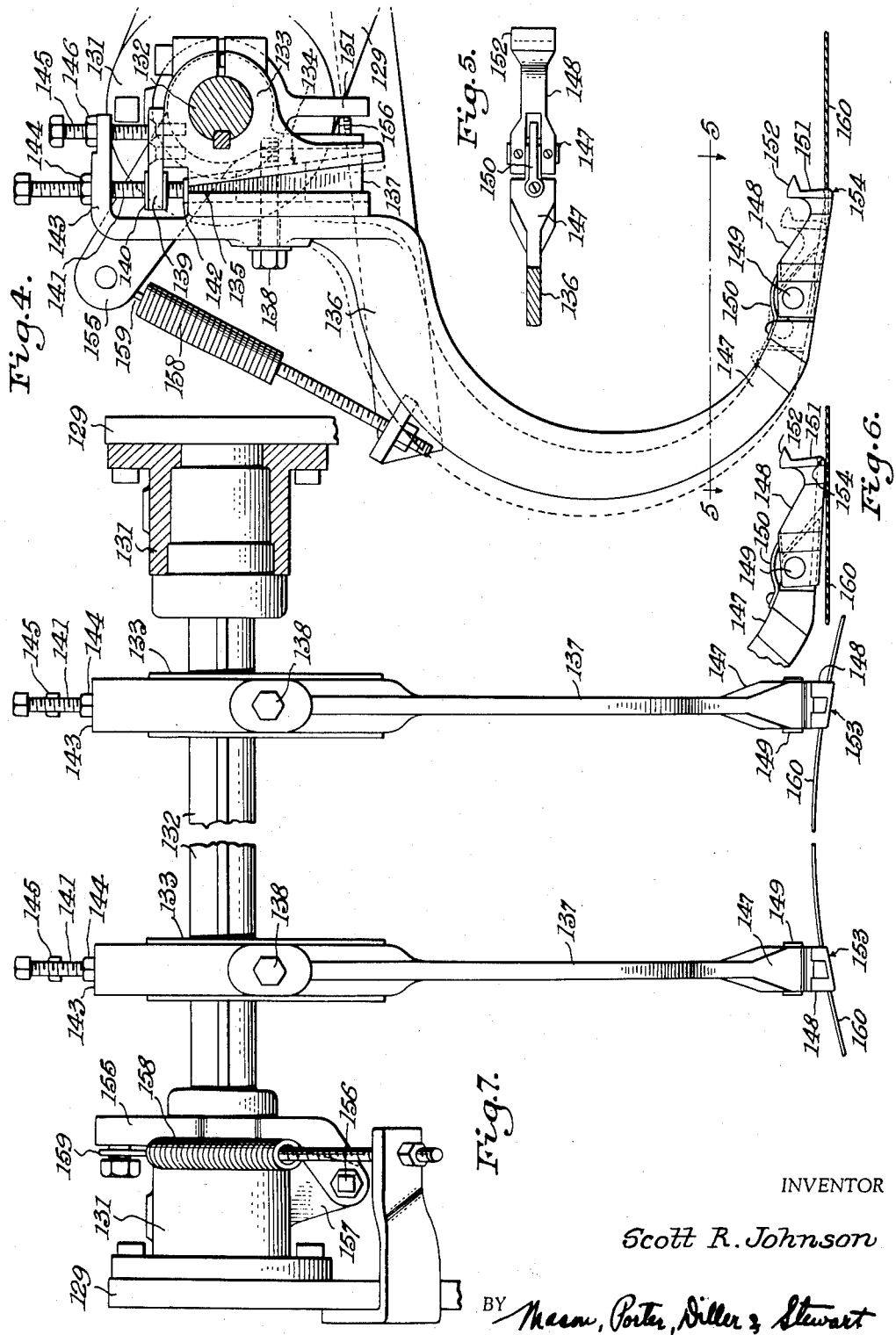

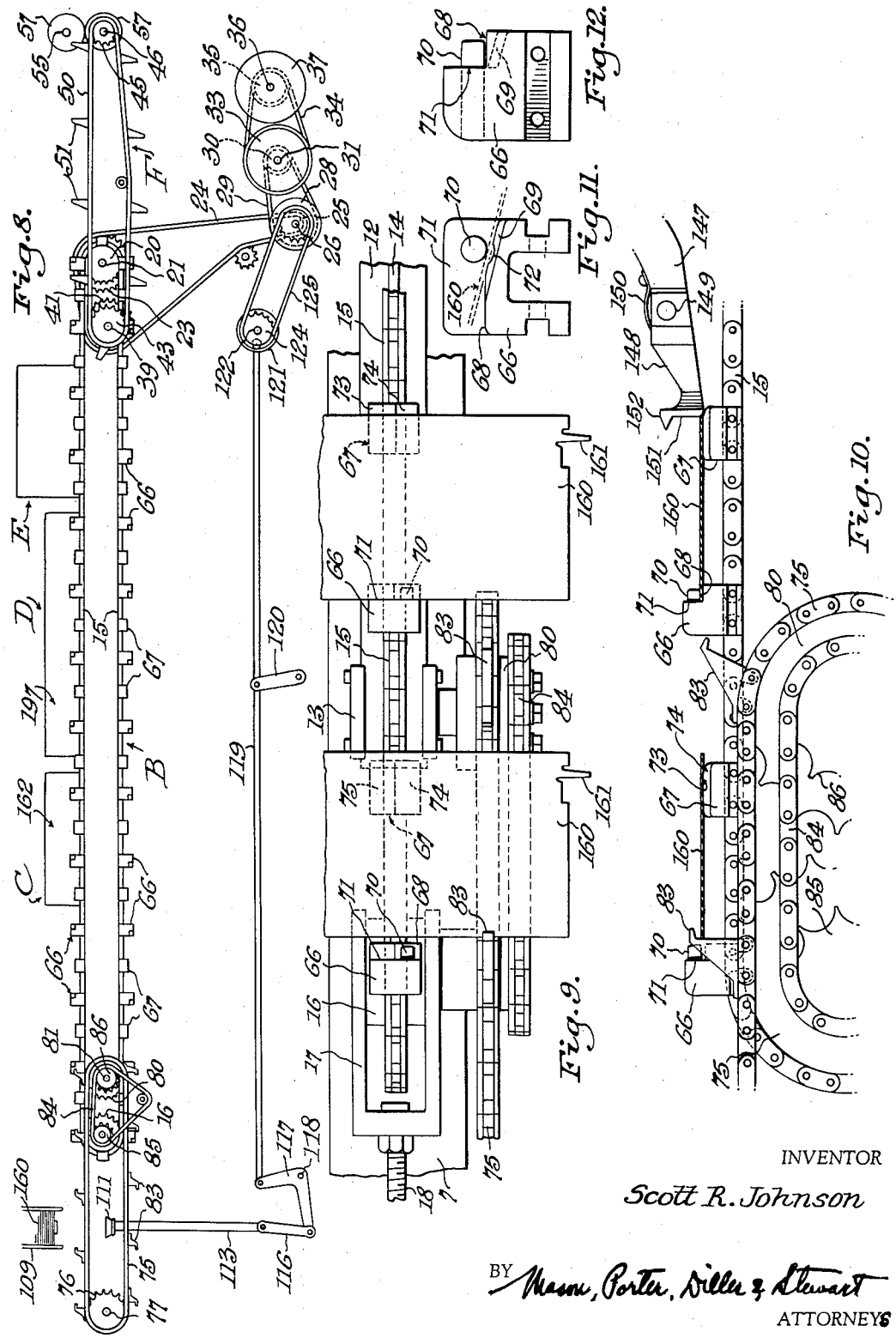

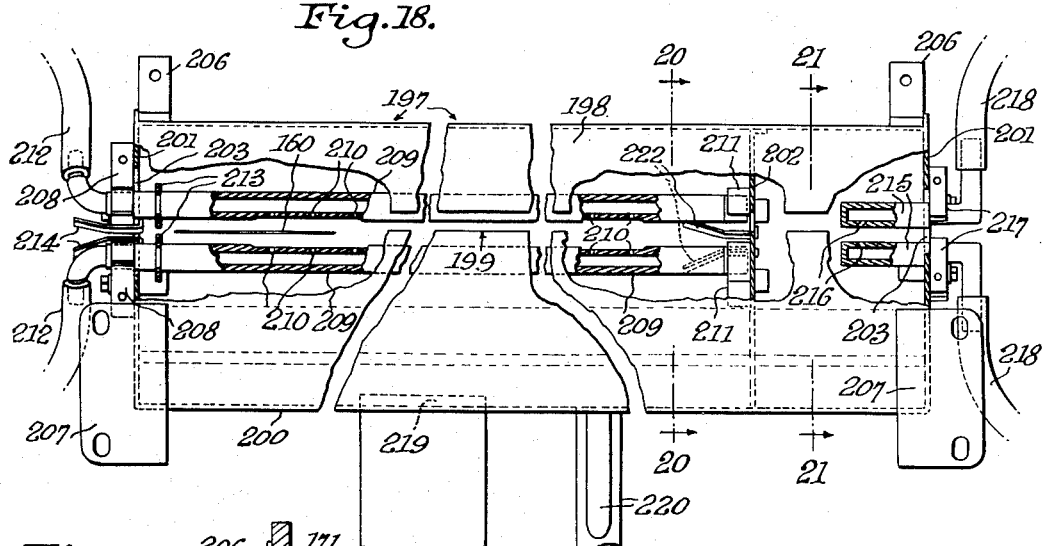
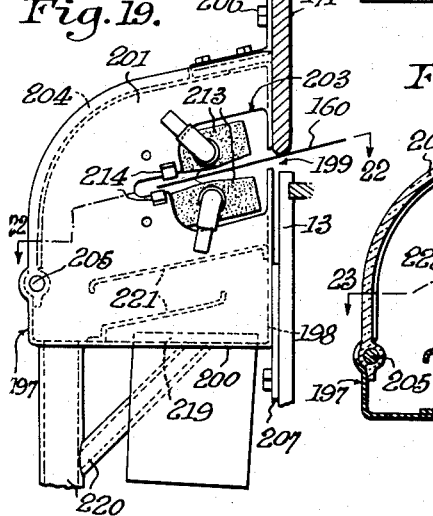
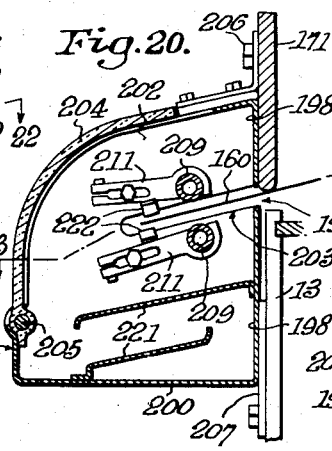
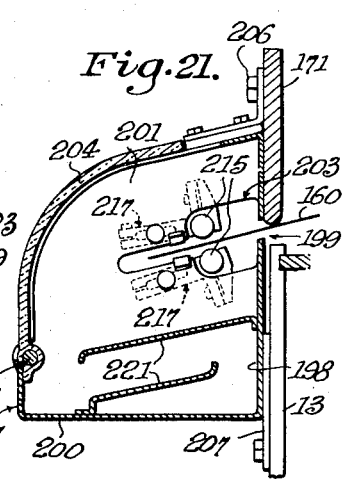
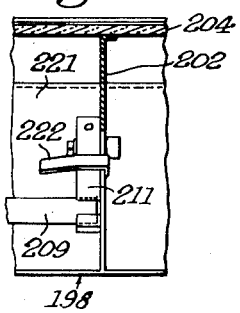

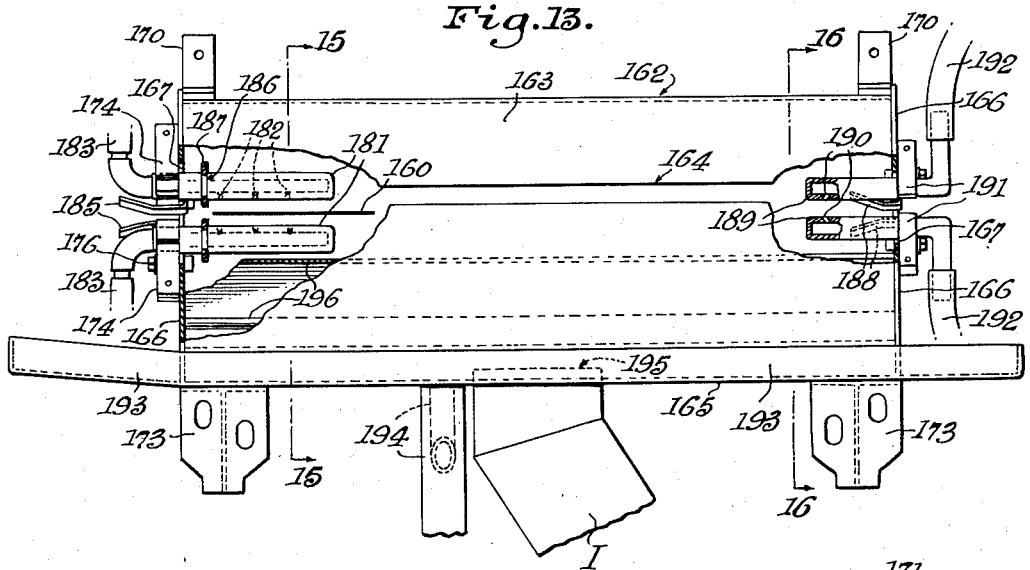
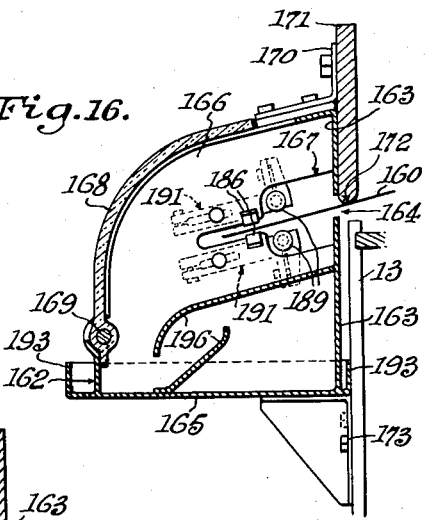
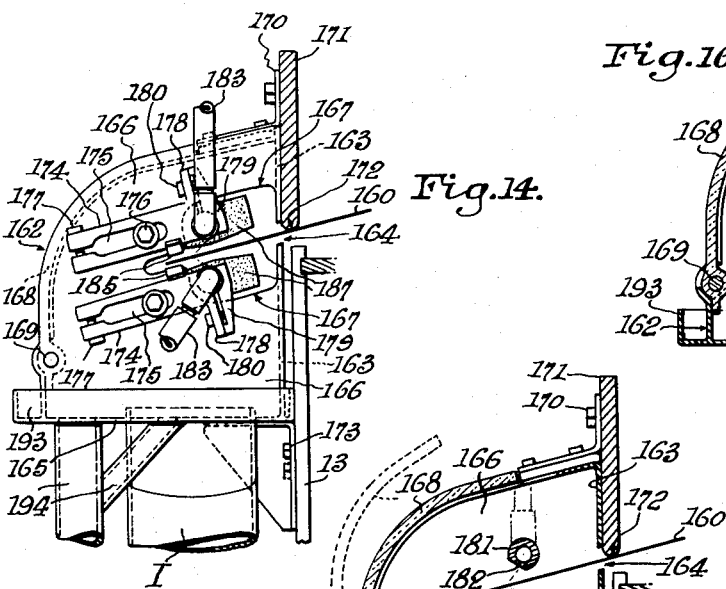
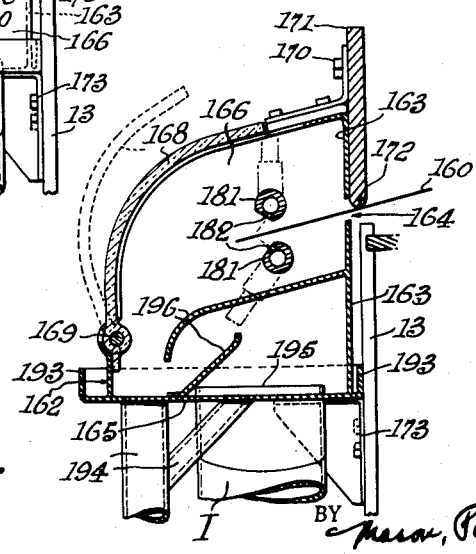
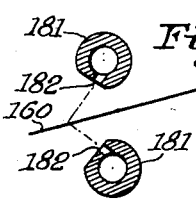

Dec. 20, 1955  S. R. JOHNSON  2,727,740
BOWED SHEET ADVANCING MEANS
Filed Aug. 2, 1949  11 Sheets-Sheet 10

INVENTOR
Scott R. Johnson
BY
ATTORNEYS

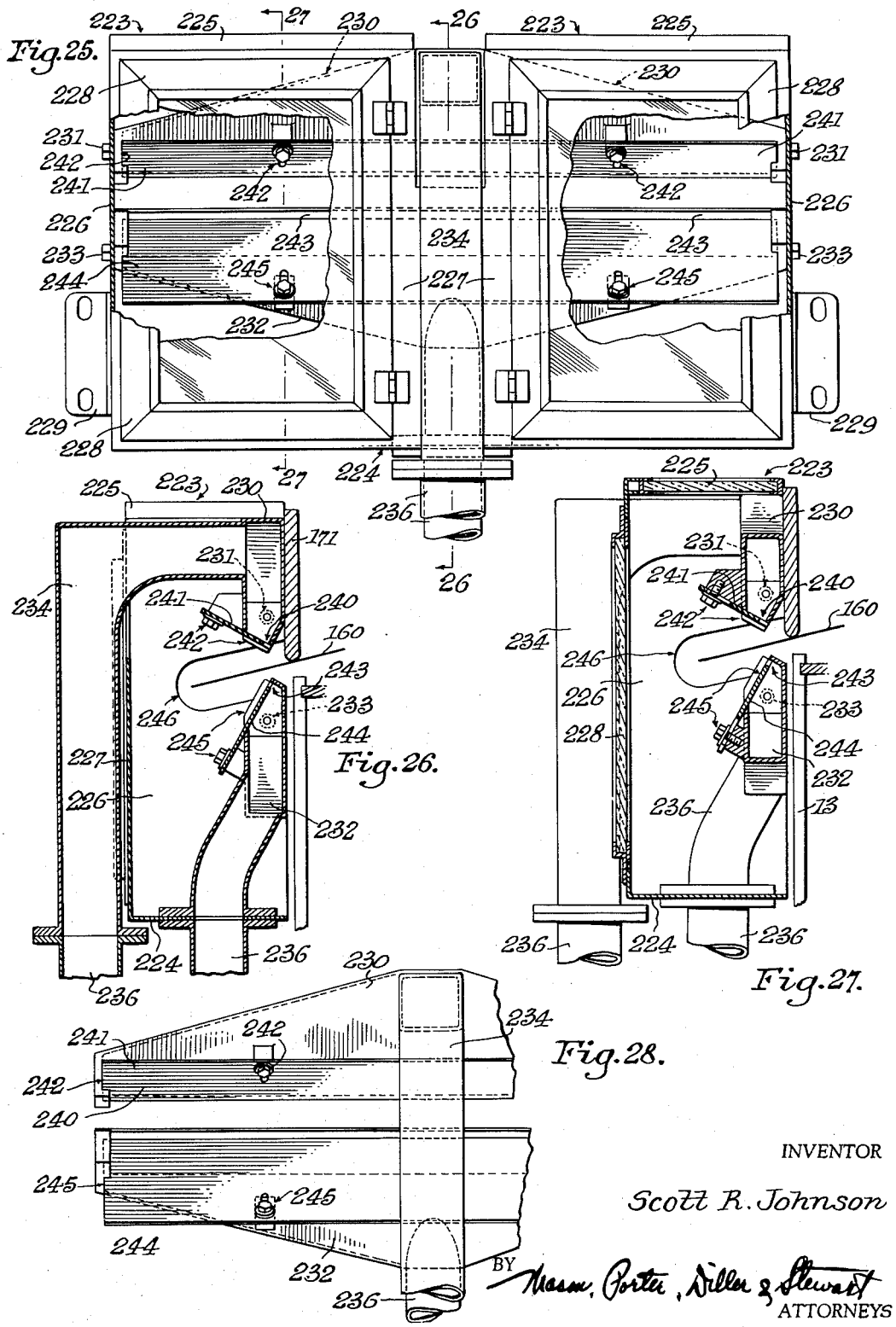

United States Patent Office 2,727,740
Patented Dec. 20, 1955

2,727,740

BOWED SHEET ADVANCING MEANS

Scott R. Johnson, River Forest, Ill., assignor to Continental Can Company, Inc., New York, N. Y., a corporation of New York Application August 2, 1949, Serial No. 108,173

16 Claims. (Cl. 271—12)

The invention relates generally to the art of manufacturing cans and primarily seeks to provide an improved apparatus for deoxidizing the can body blank marginal edge portions intended to be formed into the side seams in can bodies.

It is well known that in order to solder black plate, the portions thereof to be soldered must be cleansed of oxidation and scale, for without such cleansing the solder will not properly adhere to the metal. A purpose of the present invention is to provide an improved apparatus adapted for very rapidly and efficiently cleaning the edge portions of the blanks which are to be joined in the formation of can body side seams and solder bonded, novel means being provided for first spraying the marginal edge portions of the blanks with a cleaning acid, then spray washing the acid treated edges with water to remove residual acid, and then directing blasts of hot air against said acid and water treated edges to thoroughly dry them so that the body blanks may be stacked and temporarily stored, or passed directly into a body maker and made up into can bodies including solder bonded side seams.

Another object of the invention is to provide an apparatus of the character stated including novel means for handling the can body blanks as they are being treated, said means including a supply stack, suction means for withdrawing the blanks one-by-one from the stack, an arched support plate and magnet means for receiving the blanks from the suction means and holding them in bowed relation with the marginal edges to be treated directed laterally and downwardly, a first conveyor means continuously driven and effective to feed the body blanks in processional order away from the magnet means, hold down means cooperating with the plate in maintaining the bowed relation of the blanks as they are moved away from the magnets, a second conveyor means continuously driven at an accelerated rate relative to said first conveyor means and effective to take over the feeding of the blanks therefrom and having novel driver lugs thereon for engaging the blanks and holding them in bowed relation in conjunction with a single centrally disposed support rail while the marginal edge portions thereof are being treated, and a third conveyor means continuously driven at an accelerated rate relative to said second conveyor means and effective to take over the feeding of the blanks therefrom after the edge treating of the blanks has been completed.

Another object of the invention is to provide an apparatus of the character stated in which each of the first, second and third conveyor means comprises a pair of chains having blank feeder lugs thereon, and in which there are included means for adjusting the relative positions of the several chains for the purpose of aligning the lugs on the chains of the respective pairs, and also for properly timing the lugs on each pair of chains with those on the cooperating pairs.

Another object of the invention is to provide an apparatus of the character stated in which the body blanks are held in bowed relation on the second conveyor means by pairs of chain lugs, each lug of a given pair having a downwardly and laterally sloping support shelf portion, an upstanding pusher portion and a gripper pin closely overlying a depression in the respective shelf portion and projecting forwardly for overlying and gripping a blank against said shelf portion, there being included a central longitudinal rail to either side of which the lugs of the pairs travel at a slightly lower level, and means for engaging the advance edges of the blanks as they are being picked up by said lugs to force the blanks back under the lug pins in bowed relation.

Another object of the invention is to provide an apparatus of the character stated in which the means for forcing the blanks under the bowing pins comprises a pair of yieldingly mounted, pivoted interceptor arms disposed to engage with the advance edges of the blanks as they are being moved along so as to yieldingly resist movement of the blanks and force them under the pins and then be displaced by the travelling blanks, means also being included for accurately adjusting said arms to properly intercept the blanks and be displaced thereby.

Another object of the invention is to provide an apparatus of the character stated in which the laterally and downwardly extending, longitudinally travelling marginal edge portions of the blanks pass through housings at opposite sides of the feedway and have a cleaning acid sprayed downwardly and outwardly, and upwardly and outwardly thereagainst from nozzles mounted within the housings, the same housings also having air blast nozzles mounted therein adjacent the discharge ends thereof and effective to direct air blasts against the marginal edge portions of the blanks to drive off the cleaning acid as the blanks are about to pass out of the housing.

Another object of the invention is to provide an apparatus of the character stated in which the laterally and downwardly extending, longitudinally travelling marginal edge portions of the blanks pass through housings at opposite sides of the feedway and have water sprayed downwardly and outwardly, and upwardly and outwardly thereagainst from nozzles mounted within the housings, the same housings also having air blast nozzles mounted therein adjacent the discharge ends thereof and effective to direct air blasts against the marginal edge portions of the blanks to wash off residual cleaning acid therefrom as the blanks are about to pass out of the housing.

Another object of the invention is to provide an apparatus of the character stated wherein the housings at the acid cleaning station, or at said station and also at the water washing station have separate means for conveying away the acid or water laden air, or the surplus acid or water, novel baffle means being provided for assuring against introduction into the air conveying means of any of the acid or water in free liquid form.

Another object of the invention is to provide in apparatus of the character stated, housing means whereon novel equipment is provided for adjustably mounting the several nozzles so that they can be readily adjusted as to the direction of the spray, the spacing apart of the nozzles and the distance of the nozzles from the lateral edge extremities of the traveling blanks.

Another object of the invention is to provide in apparatus of the character stated, novel baffle means for preventing egress of spray from the openings in the housings through which the laterally extending portions of the blanks pass in travelling into and from the housings.

Another object of the invention is to provide an apparatus of the character stated in which the laterally and downwardly extending, longitudinally travelling marginal edge portions of the blanks pass through housings at opposite sides of the feedway and have sheet-like blasts of hot air directed downwardly and outwardly, and upwardly and outwardly thereagainst from nozzles mounted within the housings for the purpose of thoroughly drying said marginal edge portions, means being provided for adjusting said air blasts.

With the above and other objects in view that will hereinafter appear, the nature of the invention will be more clearly understood by reference to the following detailed description, the appended claims and the several views illustrated in the accompanying drawings.

In the drawings:

Figures 1 and 1A, joined at the dot and dash line A—A, together comprise a somewhat diagrammatic plan view illustrating the invention.

Figures 2 and 2A, joined at the dot and dash line B—B, together comprise a central longitudinal sectional view of the apparatus illustrated in the composite Figure 1—1A.

Figure 3 is a vertical cross section taken on the line 3—3 on Figure 1.

Figure 4 is a detail enlarged vertical cross sectional view illustrating one of the blank interceptor arms.

Figure 5 is a detail horizontal section taken on the line 5—5 on Figure 4.

Figure 6 is a fragmentary side elevation illustrating the blank interceptor shown in Figure 4, a blank being shown in the process of sliding under the interceptor after having been intercepted thereby.

Figure 7 is a fragmentary vertical cross section illustrating the pair of blank intercepting arms.

Figure 8 is a diagrammatic side elevation illustrating the arrangement of the first, second and third blank conveyor chain sets, the suction feeders, the arrangement of the several treating stations, and the chain driving means.

Figure 9 is a fragmentary plan view illustrating the taking over of the feeding of a blank by the pin lug equipped or second conveyor chain means.

Figure 10 is a right side elevation of the parts illustrated in Figure 9, one of the interceptor arms also being shown in the process of intercepting a body blank and forcing the same under the lug chains.

Figure 11 is a face view of one of the chain lugs.

Figure 12 is a left side elevation of the lug shown in Figure 11.

Figure 13 is a right side elevation of one of the acid treating housings, parts being broken away and in section to illustrate the acid spraying nozzles and the air jetting nozzles.

Figure 14 is a right end elevation of the housing structure shown in Figure 13.

Figure 15 is a vertical cross section taken on the line 15—15 on Figure 13.

Figure 16 is a vertical cross section taken on the line 16—16 on Figure 13.

Figure 17 is an enlarged cross sectional view illustrating the contact of the acid spray with the marginal edge portions of the blank at one side thereof.

Figure 18 is a right side elevation of one of the water treating or washing housings, parts being broken away and in section to illustrate the water spraying nozzles and the air jetting nozzles.

Figure 19 is a right end elevation of the housing structure illustrated in Figure 18.

Figure 20 is a vertical cross section taken on the line 20—20 on Figure 18.

Figure 21 is a vertical cross section taken on the line 21—21 on Figure 18.

Figure 22 is a fragmentary horizontal section taken on the line 22—22 on Figure 19.

Figure 23 is a horizontal section taken on the line 23—23 on Figure 20.

Figure 24 is an enlarged cross sectional view illustrating the contact of the water spray with the marginal edge portions of the blank at one side thereof.

Figure 25 is a side elevation illustrating one of the blank drying housings, parts being broken away and in section to illustrate the air blasting nozzles within said housing.

Figure 26 is a vertical cross section taken on the line 26—26 on Figure 25.

Figure 27 is a vertical cross section taken on the line 27—27 on Figure 25.

Figure 28 is a fragmentary face view illustrating one cooperating pair of upper and lower blasting nozzles.

Figure 29 is a fragmentary side elevation illustrating the driving connection between the first and second chain conveyor sets.

Figure 32 is a detail left side elevation illustrating the drive connection at the delivery ends of the pin lug chains and the receiving ends of the feed-away chains.

Figure 33 is a fragmentary vertical cross section taken across the feed-away chains and illustrating the means for supporting said chains and guiding the blanks being conveyed thereby.

Figure 34 is a fragmentary face view illustrating the adjustable sprocket through which the suction cup operating crank disk is driven.

Figure 35 is a fragmentary end elevation illustrating the mounting of the blank delivery roller carrying shafts.

Figure 31:
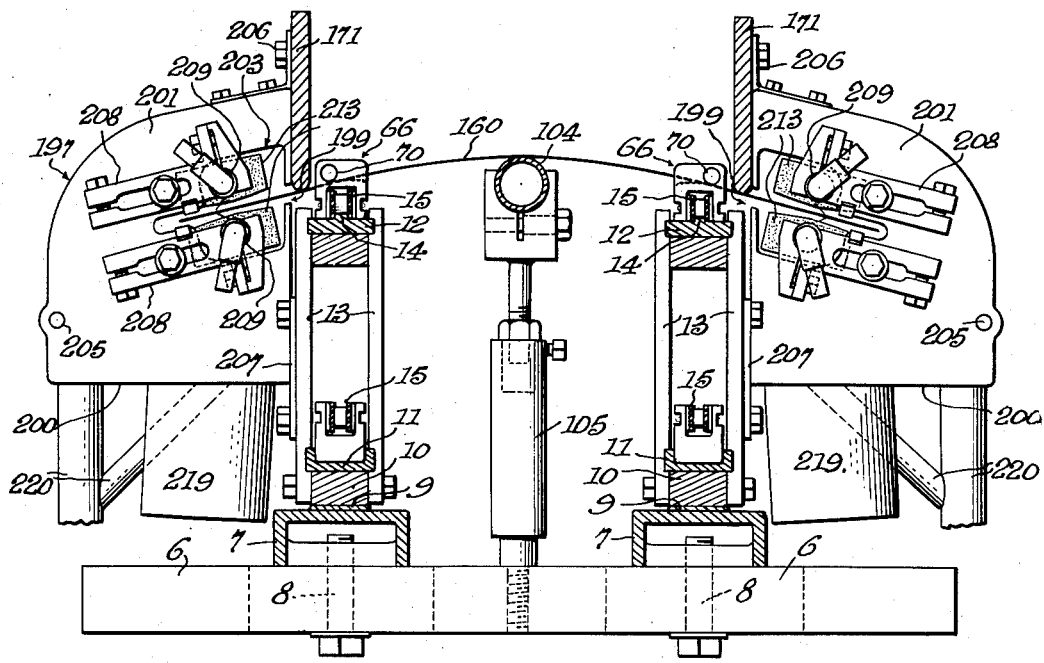
Figure 31 is a vertical cross section taken across the blank feedway at the entrance to the water spraying or washing station.

In the example of embodiment of the invention herein disclosed the novel arrangement of can body blank edge deoxidizing apparatus takes the form of a unit or attachment from which the acid cleaned blanks can be delivered directly into a body maker for being formed into can bodies and solder bonded, or may be stacked for subsequent feeding into a body maker at such time and under such conditions as will assure against reoxidation before the body forming and solder bonding of side seams takes place.

In the somewhat diagrammatic illustration in Figures 1, 1A, 2 and 2A, the apparatus is shown as including a stack supply A from which the blanks are withdrawn, one-by-one, by a sucker means and deposited on the feeding or conveyor means generally designated B which feeds the blanks continuously through the various treating stations and from the delivery end of the apparatus to be stacked directly on the machine, or conveyed elsewhere, for stacking or for feeding directly to a body maker. The laterally projecting, longitudinally extending marginal edges of the blanks pass through identical treating means at opposite sides of the feedway along which they continuously travel, first passing through the acid cleaning station C, then the water washing station D, then the hot drying station E, and finally through a cooling run F to be discharged as aforesaid.

The acid spray to the blank edges at the acid treating station C is supplied from tank means generally designated G and preferably is recirculated with provision for suitable make-up. A suitable scrubbing tank means generally designated H is provided, and into it fumes from the acid cleaning station are directed as at I, as well as moisture laden air from the washing station, and drain water from the water washing station is directed into said scrubbing tank means as at J. After the desired scrubbing action within the tank means H, the fumes are carried off through the duct K, and the water passes out through a floor drain. These acid source and scrubbing tank features form no part of the present invention and are not disclosed in detail herein.

The improved apparatus includes frame structure generally designated 5 and including a plurality of transverse support members 6 whereon two longitudinally extending, parallel inverted support channels are mounted. The channels 7 extend from the front of the apparatus to a point slightly beyond the blank washing station and are laterally-adjustably secured on the support members 6 in the manner indicated at 8. See Figures 1, 1A, 2, 2A, 3, 30 and 31.

Throughout the span of the several treating stations, and beyond said stations toward each end of the apparatus the rails or channels 7 are provided with support pads 9 whereon longitudinal support rails 10 rest, being secured thereon in any approved manner, as by welding or the like. On these supporting rails 10, chain return channels 11 are secured for supporting the lower or return flight of the main conveyor chain to be described in detail hereinafter. The upper flights of said chains travel over supporting rails 12 which are suitably supported above the channels 11 on notched plates 13. The upper rails provide upper guide ribs 14 over which the upper flights of the main conveyor chains travel in the manner clearly illustrated in Figures 1, 1A, 30 and 31, from which it will be apparent that the support plates 13 are secured to the previously described support rails 10.

The main conveyor chains 15 travel in parallel relation over the supporting members 11 and 12, and at their front ends said chains pass over two sprockets 16 which are secured on idler stubs freely rotatable in bearing blocks 17 which are slidably mounted on the supporting channels 7. See Figures 1, 2 and 29. Tightener devices generally designated 18, connected with the bearing blocks 17 and engaging fixed brackets 19, serve to retain the chains 15 in suitably tight condition. At their delivery ends the chains 15 pass over driver sprockets 20 secured on a cross shaft 21 which is rotatable in frame supported bearings 22. See Figures 1A, 2, 2A and 32. The shaft 21 has a large sprocket 23 fixed thereon, and rotation is imparted thereto by a driver chain 24 which passes over a small sprocket 25 on a cross shaft 26 which is rotatable in frame supported bearings 27. A large pulley 28 secured on the cross shaft 26 is driven by belts 29 which are in turn driven by a small pulley 30 secured on a shaft 31 which is rotatable in the frame supported bearings 32. A large pulley 33 is secured on the shaft 31 and rotation is imparted thereto and to said shaft by belts 34 which pass over the small pulley 35 mounted on the shaft 36 of the driving motor 37 which is supported as at 38 on the frame structure.

Another cross shaft 39 is rotatable in frame supported bearings 40, adjacent and in parallel relation to the previously mentioned shaft 21, and this shaft is driven by engagement of the previously mentioned driver chain 24 over a sprocket 41 adjustably secured on the shaft 39 in the manner indicated at 42. It is to be noted that the sprocket 41 is slightly smaller than the sprocket 23 through which the main conveyor chains 15 are driven, the intent being to drive the shaft 39 at an accelerated speed with relation to that of the shaft 21. The shaft 39 has two sprockets 43 mounted thereon, one said sprocket being adjustable as at 44. A similar adjustment, also indicated 44, is provided on one of the sprockets 20 which drive the main conveyor chains 15. The purpose of these adjustments 44 will be described hereinafter. The sprockets 43 cooperate with sprockets 45 secured on a cross shaft 46 which idles in bearings 47 provided in end brackets 48 which are adjustably mounted as at 49 at the end of the frame structure. A pair of feed-away chains 50 pass over the sprocket sets 43 and 45 and are equipped with feeder lugs 51 for suitable feeding contact with the edges of the can body blanks being fed and treated. The upper flights of the feed-away chains run over rails 52 which are adjustably supported as at 53 on the frame cross members 54.

Another cross shaft 55 is disposed in parallel relation above the idler shaft 46, the same being rotatable in bearings 56 provided in the previously described brackets 48. The shafts 46 and 55 have feeder rollers 57 secured thereon which cooperate in the manner clearly illustrated in Figures 1A and 2A to deliver from the apparatus the can body blanks fed thereto by the upper flights of the conveyor chains 50.

It will be apparent by reference to Figures 1A, 2A and 33 that side angles 58 serve to guide the laterally extended edge portions of the blanks being fed by the chains 50, and said angles are supported as at 59 on the rails 52 over which the upper flights of said chains travel. A center support rail 60 also is provided for supporting the central portions of the blanks as they are being fed along by the chains 50, and said rail is supported as at 61 on the previously mentioned cross members 54. While passing over the center rail 60 the central portions of the blanks pass under cooperating, yieldably depressed confining rails 62 which are supported yieldingly and in properly spaced relation above the rail 60, as at 63, on cross members 64 attached to the side angles 58. Said cross members also serve to rigidly support a confining rail 65 over each of the side angles 58.

It will be apparent by reference to Figures 1 and 8 to 12 that the main conveyor chains 15 are equipped with blank holding and conveying lugs 66 which are mounted in equidistantly spaced relation therealong, a blank supporting or rest lug 67 being disposed intermediately of each two of the lugs 66. Each blank holding and conveying lug is equipped with a low level shelf portion 68 having a forwardly extending, laterally and downwardly angled portion 69, and a grip pin 70 projects forwardly over each said laterally and downwardly angled shelf portion 69. Each pin 70 projects forwardly from an upstanding pusher wall 71, and a grip depression 72 is provided in the shelf directly beneath each said pin. While the lugs 66 are designed to engage behind and push the blanks, the intermediate lugs 67 are intended as intermediate supports only, and hence they include no upstanding pusher portions but rather are plain faced and include only a flat top portion 73 and an outwardly and downwardly angled portion 74.

Figure 30:
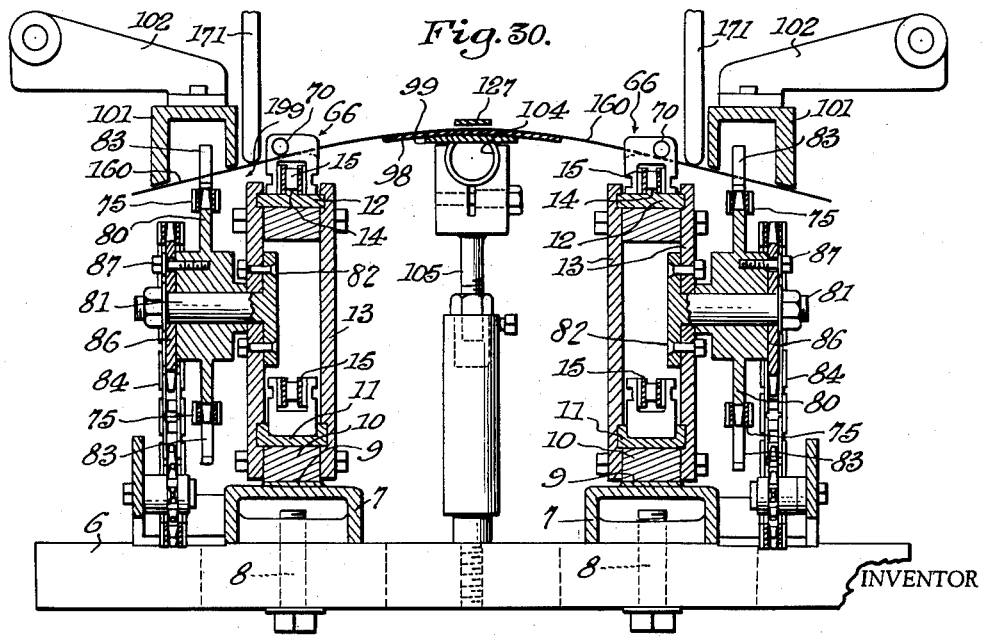
Figure 30 is a vertical cross section taken on the line 30—30 on Figure 1.

It will be apparent by reference to Figure 1, 1A, 2 and 2A that the main conveyor chains 15 with the lugs 66 and 67 thereon extend from a point well in advance of the first or acid treating station C to a point well beyond the last or hot air drying station E, and during the treating of the blanks, said chains, or rather the chain lugs 66 thereon serve to hold the blanks in the downwardly bowed position clearly illustrated in Figures 30 and 31. The conveyor chains 15 receive the blanks from initial feed conveyor chains 75 disposed at the front of the machine in the manner clearly illustrated in Figures 1, 2 and 8 of the drawings. At their front or receiving ends, this first set of feeder chains 75 pass over sprockets 76 which are fixed on stub shafts 77 idling in bearings 78 which are adjustably mounted as at 79 on the channels 7. At their delivery ends, the chains 75 pass over sprockets 80 which idle over stud shafts 81 fixedly supported in certain of the support plates 13 which are attached to the main chain supporting rails 10, 11 and 12 in the manner clearly illustrated in Figure 30. It will also be apparent by reference to Figures 8, 10 and 30 that the chains 75 are equipped with feeder lugs 83 and are driven by short chains 84 which take over small sprockets 85 fixed on the idler studs 16 and over slightly larger sprockets 86 which are adjustably secured as at 87 to the previously mentioned sprockets 80. The chains 75 pass over supporting rails 88 which are mounted on brackets 89 attached to the longitudinal channels 7. See Figures 2 and 3. It will be noted that the rails 88 include outwardly and downwardly sloping side portions 90 which serve to guide the laterally extended edge portions of the blanks in the manner illustrated in Figure 3. The rails 88 also serve as supports for the blank drop guides 91 which are secured as at 92 to the outer faces of the rails.

Brass flange rails 93 extend along the inner faces of the rails 88 where the blanks are received thereon and serve to support and insulate a pair of fixed magnets 94, grip blocks 95 also serving as means for removably securing said magnets in place in conjunction with the mounting screws 96. It will be noted by reference to Figures 1, 2 and 3 of the drawings that the magnets are U-shaped in cross section, and brass blank rest rails 97 are mounted in and extend slightly above the center grooves in said magnets to serve as slide surfaces over which the blanks are conveyed. By reason of projecting the brass fillers 97 slightly above the magnets in the manner illustrated in Figure 3, the conveyed blanks are held out of direct contact with the magnets.

An arched plate 98 extends between the chains 75—75 and 14—14 and is supported by a center bracket 99 which is attached as at 100 to the frame structure. The can body blanks are placed one-by-one over the arched plate at the receiving station illustrated in Figure 3 in a manner to be described hereinafter, and the magnets 94 hold the blanks with their laterally extending portions bent downwardly in the manner illustrated in Figure 3 until the chain lugs 83 pick them up and feed them forwardly under the holddown rails 101 which are supported as at 102 in the manner clearly illustrated in Figures 1 and 30 of the drawings. It will be noted that the supports 102 for the holddown rails 101 are pivotally mounted on the super-structure frame 103, and this manner of mounting makes it possible to swing the holddown rails upwardly and outwardly from the operative position illustrated in Figures 3 and 30.

It will be apparent by reference to Figures 1, 2, 30 and 31 that as the blanks are fed forwardly from the delivery end of the arched plate 98 they pass onto a longitudinal rod or support 104 which is vertically-adjustably supported as at 105 on the frame members 6. The central support 104 delivers onto the previously described center rail of the feed-away conveyor structure and cooperates with the chain lugs 66, 70 on the main conveyor chains 15 in holding the can body blanks in the downwardly bowed condition illustrated in Figures 30 and 31.

Referring now to Figures 2 and 3 of the drawings it will be observed that the frame super-structure includes two longitudinal supporting rails 106 whereon two transverse support bars 107 are adjustably mounted as at 108. The bars 107 serve as supports for the stack confining and supporting uprights 109. By reference to Figures 1 and 3 it will be observed that the arched plate 98 is equipped with cutouts 110 which permit vertical reciprocation of a pair of sucker cups 111 which are mounted on a cross head 112 secured on the upper end of a plunger 113. The plunger is vertically reciprocable in a guide 114 having suction source connection at 115, and is link connected at 116 with one arm of a bell crank lever 117 pivoted as at 118 on the machine frame. The other arm of the bell crank 117 is connected with a thrust rod 119, and said rod is link supported intermediately of its ends as at 120 and has its rear end connected with a crank disk 121 secured on an idler shaft 122 which is rotatable in frame supported bearings 123. See Figures 2, 2A and 34. The shaft 122 has a sprocket 124 adjustably mounted thereon, and rotation is imparted to said sprocket and shaft by a chain and sprocket connection 125 with the previously described cross shaft 26. The usual manually operable inching hand wheel and clutch equipment may be associated with the driver shaft 26, and this equipment is general designated 126.

It will be observed by reference to Figures 1 and 2 of the drawings that a holddown rail 127 overlies the arched plate 98 and is supported as at 128 from the superstructure. The holddown rail serves to closely confine the central portions of the blanks over the arched plates as they are being fed away from the blank receiving station.

Brackets 129 are supported as at 130 on the frame super-structure and serve as supports for bearings 131 in which a transversely disposed shaft 132 is rockably mounted. See Figures 2 and 4 through 7. Two carriers 133 are secured on the rocker shaft 132, and each has a grooved, angularly disposed face 134 which is opposed by a grooved face 135 formed on an interceptor or justifier arm 136. A wedge block 137 is interposed between the angularly disposed, grooved faces 134 and 135, and a securing screw 138 is directed through a receiving aperture in each arm 136, through a longitudinal slot in the respective wedge block 137 and into a tap in the respective carrier 133 to hold said parts in adjustably assembled relation. A bracket extension 139 from each carrier 133 overlies the respective wedge block 137 and carries a captive nut 140 through which an adjuster screw 141 is threaded, each said screw being rotatably anchored as at 142 in the upper end of the respective wedge block and being threaded into the angularly turned end portion 143 of the respective arm 136. It will be apparent that by loosening the screw 138 and turning the respective screw 141, longitudinal movement can be imparted to the respective wedge block 137 which will result in a variation of the spacing of the opposing faces 134 and 135 of the respective carrier 133 and the associated interceptor arm 136. The adjustment of the screws 141 may be fixed by manipulation of the jam nuts 144. Also, by adjusting the screws 145 which are threaded through the arm extensions 143 and contact with the upper surfaces of the carrier extensions 139, the arms 136 can be lifted or lowered, and the adjustment of the screws 145 may be fixed by manipulation of the jam nuts 146. It will be apparent that by adjusting the devices above referred to, the position in operation of the curved extensions 147 of the interceptor arms 136 may be adjusted at will.

At its end extremity, each interceptor arm extension 147 has an interceptor lug 148 pivoted thereon as at 149. Each pivotal connection 149 includes a knee joint which limits downward deflection of the respective lug 148 to the position illustrated in Figure 4, and a leaf spring 150 attached to each arm end and overlying and contacting the respective lug 148 tends constantly to hold the lug in a normal position illustrated in Figure 4. Each lug 148 includes an upright blank edge engaging or intercepting face 151, and an overhanging projection 152 which will insure against passage of the lug beneath a blank edge during the intercepting of a blank in a manner to be described hereinafter. It will also be observed by reference to Figure 7 that the bottom face of each lug 148 is angled as at 153 to correspond to the positioning of the blanks in the arched condition illustrated in said figure. The corners of the interceptor lugs at the lower extremity of the interceptor faces 151 are well rounded as at 154.

A stop plate 155 is secured at one end of the shaft 132 and carries an adjustable stop 156 which is engageable with a stop 157 formed on the adjacent bearing 131. A spring 158 anchored to the framing in the manner clearly illustrated in Figure 7, and connected as at 159 to the plate 155 constantly tends to hold the interceptor arms 136 in place against the stop 157, or in other words in position for intercepting the can body blanks as they are fed along in processional order by the first feeder chains 75, 83. The can body blanks have been designated 160, and it will be observed by reference to Figure 9 that in the present illustration the blanks are of the type employed in the formation of tear strip can bodies and include tongue projections 161.

It will be apparent that as the shaft 122 is rotated, the crank disk 121 will reciprocate the thrust rod 119 and result in vertical reciprocation of the plunger 113 which carries the sucker cups 111. Each time the cups engage the lowermost can body blank 160 in the supply stack A they will draw down the lowermost body blank and arch the same over the arched plate 98 in the manner clearly illustrated in Figure 3, the magnets 94 serving to retain this arched condition of the blanks as the suction cups move down through the clearances 110 and release the blanks. The reciprocation of the cups 111 can be properly timed by adjustment of the crank disk driving sprocket 124 so that a can body blank will be placed in the manner described just ahead of the approach of each set of the first feeder chain lugs 83. It will also be apparent that by use of the sprocket adjustments 87, the lugs 83 on the first feeder chains 75 can be properly aligned one with the other, and also timed with the feeder lugs 66 on the main chains 15 which take over the feeding of the blanks from said feeder chains 75. The first feeder chains 75 are driven from the main feeder chains 15 through the device clearly illustrated in Figs. 2, 9, 10, 29 and 30 of the drawings, and since the driver sprockets 85 are smaller than the driver sprockets 86 it will be apparent that the speed of movement of the main chains 15 is accelerated with relation to the speed of movement of the first feeder chains 75. The manner in which the main chain feeder lugs take over the feeding of the blanks from the lugs 83 of the first feeder chains 75 is clearly illustrated in Figures 9 and 10 of the drawings. In these figures, a blank is shown in the progress of being advanced by the lugs 83 of the first feeder chains 75, and the more rapidly travelling feeder lugs 66 of the main feed chains 15 are about to overtake said feeder lugs 83 and take over from them the feeding of the blank. At this time the blanks are being held in their downward bowed position by the arched plate 98 and the overlying holddown rails 101. They are abutted by the lugs 83 on the first feeder chains 75 and are resting on the intermediate lugs 67 of the main feeder chains 15. While passing from the position shown at the left in Figures 9 and 10 to the position illustrated at the right in said figures, the main chain feeder lugs 66 will take over the feeding of the blanks and the previously effective first feeder chain lugs 83 will pass downwardly in the manner illustrated in the central portion of Figure 10. Just after the main chain feeder lugs 66 approach the trailing edges of a blank 160, the advance edge of said blank will come against the upright faces 151 of the intercepting and justifying lugs 148, and the yieldably mounted arms 136 will yieldably resist forward movement of the blank and cause the trailing edge thereof to be forced back under the pins 70, thus serving to secure the blanks in the downwardly bowed condition illustrated in Figure 31. The slight depression 72 on the shelf 69 beneath each pin 70 serves to very slightly deform the springy edge of the blank and hold the same against inadvertent removal. As the blank is now advanced the arms 136 will be displaced in the manner indicated in dotted lines in Figure 4 so that the blank can pass under the lugs 148 in the manner illustrated in Figure 6.

The manner of aligning the lugs 83 on the respective first feeder chains 75 and the timing of said lugs with the feeder lugs 66 on the main feeder chains 15 has been described. It is to be understood that prior to the aligning and timing of said lugs 83, the proper aligning and timing of the lugs 66 of the main feeder chains 15 and those 51 of the feed-away chains 50 will have been effected. It will be obvious that the aligning of the lugs 66 and 51 on the respective chains 15 and 50 can be effected through use of the previously described sprocket adjustments 44, and by utilizing the adjustment 42 on the sprocket 41 the timing of the lugs 66 and 51 can be effected.

It has been pointed out that the sprocket 41 is slightly smaller than the sprocket 23 in order to cause the feed-away chains 50 to be driven at a slightly accelerated rate with relation to the speed of movement of the main feeder chains 15. Thus it will be apparent that by properly timing the feed-away lugs 51 they can be made to come forward at the proper time to engage the trailing edges of the can body blanks and strip them from beneath the holddown pins 70 of the main feeder lugs 66 and take the blanks away before said main feeder lugs 66 start to pass downwardly about the end sprockets 20.

The manner of handling the blanks, that is the successive feeding thereof from the supply stack and the placing and holding of the same in downwardly bowed relation, and the feeding of the blanks in processional order has been described hereinabove, and the treating of the blanks for cleaning the laterally extended longitudinally travelling marginal edge portions thereof of oxidation and scale will now be described. During the whole of this edge treating of the blanks, said blanks are being conveyed in processional order by the holddown and pusher lugs 66 on the main feeder chains 15, said blanks resting upon the intermediate or rest lugs 67 in the manner illustrated in Figures 9 and 10 while being pushed along by said lugs 66.

The blanks are first conveyed through the acid cleaning station C whereat a housing generally designated 162 is located at each side of the feedway. Since the housings are identical in construction, detailed description of one will suffice. The relative arrangement of the several treating housings is shown in Figures 1, 1A, 2, 2A and 8, and the details of construction of the acid treating housing are illustrated in Figures 13 to 16. This housing includes an inner wall 163 having a longitudinal opening 164 therethrough in order to accommodate the lateral projection of the blanks. The housing also includes a bottom 165, end walls 166 having ingress and egress openings 167 through which the laterally extended portions of the blanks 160 may pass, and a cover 168 which is preferably hinged as at 169 so that it may be swung away in order to render the interior of the housing readily accessible. Each housing is attached as at 170 to the longitudinal upright wall 171 extending along the several treating stations, and it is to be noted that the lower edge portion of each wall 171 is rounded as at 172 to constitute a guide edge which cooperates with the chain pins 70 and the central support rail 104 in maintaining the downwardly bowed relation of the blanks. The housings are attached at their bottoms as at 173 to the adjacent support plates 13, and said plates thus serve to support the housings and also the upright wall 171.

Nozzle clamps 174 are provided at the receiving end of the housing 162 and are equipped with elongated slots 175 which serve in cooperation with the mounting bolts 176 to provide pivotal and longitudinally slidable mounting for said clamps. Clamp screws 177 serve to secure said longitudinal and pivotal adjustments. Each clamp has an angled end portion 178 which is opposed by a clamp plate 179, and a clamping screw 180 serves to grip the clamp parts together with a nozzle 181 between them in the manner clearly illustrated in Figures 13 and 14. Each spray nozzle 181 is equipped with a plurality of spray orifices 182. An effective adjusted relation of the orifices 182 is illustrated in detail in Figure 17 in which the upper and lower sprays are shown directed one outwardly and downwardly, and the other outwardly and upwardly against the laterally projecting, longitudinally extending marginal edge of a can body blank. It will be apparent by reference to Figure 14 that by utilizing the several adjustments possible by reason of the novel construction of the clamps, the spraying manifolds 181 may be varied as to spacing with relation to each other, as to the distances of said manifolds from the lateral edge extremities of the blanks, and also as to the angle of the spray jets, or in other words the axes of the orifices 182. The spacing of the manifolds may be effected by swinging the clamps about the centers of the bolts 176, the distances of the manifolds from the edges of the blanks by sliding the clamps along said bolts 176, and the angular direction of the jet axes may be varied by rotating the manifolds in the clamps.

It will be apparent by reference to Figure 13 that the inner ends of the manifolds 181 are closed. The open ends of the manifolds which extend out of the housing are connected by acid delivery conduits 183 with the supply tank G, suitable needle valves 184 serving to control the amount of acid flowing to and through said nozzles. While the novel apparatus defined in the appended claims and herein described is not to be considered limited to the use of any particular blank edge cleaning solution, a 20% hydrochloric acid solution has been found practical and desirable.

Flared blank edge guides 185 are mounted at the entrant end of the housing, and each nozzle 181 is annularly grooved as at 186 to receive a rubber spray retainer. The readily replaceable and flexible flat rubber sheets 187 are so disposed with reference to the ingress openings as to effectively assure against free passage of acid spray through said opening. Flared blank edge guides 188 are mounted at the discharge end of the housing.

It will be apparent by reference to Figure 13 of the drawings that upper and lower air jet nozzles 189 also are provided adjacent the delivery end of the acid housing 162, said nozzles being provided with jet orifices 190 and being effective to direct air blasts on the marginal edge portions of the blanks which will drive off residual acid therefrom. The air jet nozzles 189 are adjustably mounted in clamps 191 which are the same in construction as those which serve to adjustably mount the acid nozzles 181, and the open ends of the air nozzles 189 extending without the housing are connected by conduits 192 with any suitable compressed air source (not shown).

The housing 162 is provided at its lower portion with a surrounding spray and condensation catching trough arrangement 193, and acid return ducts 194 extend downwardly from the bottom of the housing 162 and serve to return acid to the supply tank G. As previously stated, the fume return duct I directs fumes from the interior of the housing 162 to the scrubber tank H, and it will be noted by reference to Figures 13 to 15 that the receiving end 195 of said duct extends above the floor of the housing. The extension of the duct I above the floor of the housing and the provision of the baffle means 196 as clearly shown in Figures 13, 15 and 16 assures against the introduction of liquid acid into the duct I.

The blanks are next conveyed through the water washing station D whereat a housing 197 is located at each side of the feedway. The housings 197 are identical in construction and detailed description of one will suffice for both. These housings are illustrated in detail in Figures 18 through 23 of the drawings from which it will be observed that each includes an inner wall 198 having a longitudinal opening therethrough as in the case of the previously described housings. The water treating or washing housing also has a bottom 200, end walls 201 and an intermediate wall 202, said walls having ingress and egress openings 203 through which the laterally extended portions of the blanks 160 may pass.

Each housing 197 also includes a cover 204 preferably hinged, as at 205, and is attached at 206 to the respective upright wall 171. Each housing also is supported at its bottom at 207 on the adjacent support plates 13.

Nozzle clamps 208 are provided at the entrant end of the housings, and these are of the same construction previously described and provide the same triple adjustment for the water spray nozzles 209 which are equipped with the spray orifices 210. The water spray nozzles are much longer than the acid spray nozzles and are mounted at their far ends in clamps 211 adjustably secured on the respective intermediate wall 202. These clamps also permit the making of the three adjustments of the water manifolds in like manner as previously described in connection with the acid spray nozzles. The open ends of the nozzles 209 which extend without the housing connect with water supply ducts 212 which connect with a source of water supply (not shown).

The water spray nozzles 209 also carry rubber spray retainers 213, and flared blank guides 214 are provided at the entrant end of the housing.

As in the case of the acid spray housing, the water spray housing also is equipped with air jet nozzles 215 having jet orifices 216 and which are adjustably mounted in clamps 217 at the delivery end of the housing in the manner clearly illustrated in Figure 18. The ends of the jet nozzles 215 which extend without the housing are connected by supply conduits 218 with a suitable source of compressed air (not shown).

The interior of each housing 197 is connected with the scrubber tank H through a duct 219, and like the previously described duct I, this duct extends above the bottom 200 of the tank in the manner illustrated in Figures 18 and 19 so as to prevent direct ingress of water thereinto. Water return ducts 220 direct water from the housing 197 into the scrubber tank H, and the baffles 221 cooperate with the upward extension of the duct 219 above the floor 200 of the housing in preventing ingress of water into the duct 219. Flared blank guides 222 also are provided near the delivery end of the housing 197, these being mounted on the intermediate wall 202.

The blanks are next fed through the drying housing 223 at station E whereat the treated marginal edge portions thereof are thoroughly dried by the directing of hot air blasts in sheet form thereagainst. The dryer housings are illustrated in detail in Figures 25 to 28 and it will be noted that each includes a bottom 224, a top portion 225, ends 226 and an outer side wall 227 in which hinged doors 228 preferably are provided. Each housing is secured as at 229 to the adjacent support plates 13.

Within each housing 223 there is provided an upper air manifold 230, the same being secured as at 231 to the end walls 226. A lower air manifold 232 also is provided in each housing 223, and is secured as at 233 at its ends to the housing end walls 226.

It will be apparent by reference to Figures 1A and 2A that each upper manifold 230 connects through a duct 234 with the heater 235, and each lower manifold 232 connects through duct 236 with said heater, air being delivered to said heater through a duct 237 from the blower 238 which is driven by the motor 239. Any acceptable heating means generally designated 235 may be employed for heating the air to about 235° F. prior to introduction thereof into the manifolds 230 and 232.

Each upper manifold is provided with a sheet blast opening 240 which is controlled by a plate 241 adjustably-slidably mounted as at 242 so that the width of the opening can be changed at will. Each lower manifold also is provided with a sheet blast opening 243 controlled by a plate 244 which is slidably-adjustably mounted as at 245. It will be apparent by reference to Figures 26 and 27 of the drawings that the sheet blasts of air are directed angularly onto the marginal edge portions of the can body blanks 160, the blast from each upper manifold being directed downwardly and outwardly and the blast from each lower manifold being directed upwardly and outwardly against said blanks. Each housing also is equipped with end openings 246 through which the laterally extended portions of the can body blanks 160 may pass.

By comparing Figures 17, 24 and 26 it will be observed that the acid sprays, the water sprays and the sheet blasts of air all impinge upon the can body blanks at different distances from the lateral edge extremities thereof. It will be noted that the water sprays impinge upon the blanks at a greater distance inwardly from the extreme lateral edges of the blanks than do the acid sprays, and the sheet blasts of air impinge upon the can body blanks well inwardly of the point at which the water sprays impinge. In this manner it will be assured that the water sprays will wash all acid from the marginal edge portions of the blanks, and that the said blasts of air will drive off any residual water and serve to very thoroughly dry the treated portions of the blanks. It will also be apparent that with the laterally extending edge portions of the blanks bent downwardly, there will be no chance of acid or water spray finding its way inwardly onto central portions of the blanks.

In the operation of the apparatus the blanks are withdrawn one-by-one from the supply stack A by vertical reciprocation of the suction cups 111, and as each is bent downwardly over the arched plate 98 by downward movement of the suction cups in the manner illustrated in Figure 3, its laterally extended portions will come against the magnets 94 and be held in downwardly bowed relation thereby until the lugs 83 of the first feeder chains 75 come against the rear edge of the blank and feed it forwardly over the arched plate 98 and under the holddown members 101. Before each blank is fed off the end of the arched plate 98 onto the center support 104, the feeder lugs 66 on the main feeder chains 15 take over the feeding of the blank in the manner illustrated in Figures 9 and 10 and as previously described, and the lug pins 70 continue the holding of the blanks in downwardly bowed relation as they are conveyed through the several acid, water and air treating housings 162, 197 and 223. In passing through the acid treating housing 162, oxidation and scale will be cleansed from the marginal edge portions of the blanks by the acid spray, in passing through the water treating housing 197 the residual acid will be washed from the cleansed marginal edge portions of the blanks, and in passing through the drying housings 223 the hot air blasts will serve to thoroughly dry the treated edge portions of the blanks. As the blanks reach the ends of the main feeder chains 15 the said two chains 50 take over the feeding of the blanks in the manner previously described, and said blanks are substantially cooled, before they are delivered from the apparatus by the cooperating feeder rolls 57.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, the combination of means for supporting a stack of can body blanks, an arched plate disposed to receive blanks from the stack, vertically reciprocable suction cup means for removing the blanks one-by-one from the stack and depositing them in downwardly bowed relation on said plate, magnet means for holding the blanks in said bowed relation as the suction cups release the blanks, means for feeding the magnet held blanks away from said plate to a treating station, and means for maintaining the downwardly bowed relation of the blanks as they are being fed.

2. Apparatus as defined in claim 1 in which the magnet means comprises two U-shaped permanent magnets one thereof being disposed longitudinally in the direction of feed movement of the blanks at each side of the arched plate, each said magnet having a non-magnetic support and wear filler mounted in and extending upwardly a limited distance from the center slot therein to engage in limited area drag contact with the blanks as they are fed along and hold them out of direct contact with the magnet.

3. Apparatus as defined in claim 1 in which the means for maintaining the downwardly bowed relation of the blanks includes a longitudinally extending holddown rail overlying the path of travel of the blanks along each side of the arched plate, and means swingably mounting said holddown rails so that they can be swung upwardly and outwardly out of operative position to render the arched plate and feedway readily accessible.

4. Apparatus as defined in claim 1 in which the means for maintaining the downwardly bowed relation of the blanks includes a supporting rail forming a central longitudinal continuation of the arched plate, and holddown pins extending forwardly from pusher lugs on a pair of feeder chains forming a part of the blank feeding means and disposed one along each side of and a distance below said rail, means also being provided for yieldably intercepting each blank as it is being moved along over said rail to push the same well back against the respective pusher lugs and under the bow retaining pins.

5. In apparatus of the character described, a central longitudinally extending support rail, a pair of blank feeding chains disposed one along each side of and a distance below said rail and having pusher lugs thereon each including an upstanding pusher face and a supporting shelf extending forwardly therefrom and a holddown pin disposed in a plane lower than the top of said rail and overlying said shelf, and means for placing blanks over said rail and chains in downwardly bowed relation to be moved along by the chain lugs, means also being provided for yieldably intercepting each blank as it is being moved along over said rail to push the same well back on the lug shelves and against the pusher faces and under the holddown pins to be held in downwardly bowed relation thereby.

6. Apparatus as defined in claim 5 in which each chain lug shelf has a portion sloping outwardly and downwardly toward the respective side of the feedway and having a depression under the respective holddown pin so placed with relation to said pin and the cooperating shelf portion as to cause each blank forced back against the cooperating pusher face to be slightly indented into said recess.

7. Apparatus as defined in claim 5 in which the means for yieldably intercepting the blanks comprises a pair of yieldably displaceable uprightly disposed and swingably mounted arms, each said arm having an interceptor lug mounted on its free end in position for intercepting blanks and including an upright blank edge engaging face and an overhanging projection at the upper limit of said face for preventing upward springing of engaged blanks, said arms extending upwardly from the interceptor lugs so that the blanks will engage the interceptor lugs and be placed thereby, then cause the arms to swing forwardly and upwardly to permit the blanks to pass under the interceptor lugs.

8. Apparatus as defined in claim 5 in which the means for yieldably intercepting the blanks comprises a pair of yieldably displaceable uprightly disposed and swingably mounted arms, each said arm having an interceptor lug mounted on its free end in position for intercepting blanks and including an upright blank edge engaging face and an overhanging projection at the upper limit of said face for preventing upward springing of engaged blanks, said arms extending upwardly from the interceptor lugs so that the blanks will engage the interceptor lugs and be placed thereby, then cause the arms to swing forwardly and upwardly to permit the blanks to pass under the interceptor lugs, and said interceptor lugs being connected with the arms by upwardly breaking spring knee joints which permit the interceptor lugs to yield upwardly as the arms are swinging back to normal position when the blanks are passing under the interceptor lugs.

9. Apparatus as defined in claim 5 in which each chain lug shelf has a portion sloping outwardly and downwardly toward the respective side of the feedway and having a depression under the respective holddown pin so placed with relation to said pin and the cooperating shelf portion as to cause each blank forced back against the cooperating pusher face to be slightly indented into said recess, and in which the means for yieldably intercepting the blanks comprises a pair of yieldably displaceable uprightly disposed and swingably mounted arms, each said arm having an interceptor lug mounted on its free end in position for intercepting blanks and including an upright blank edge engaging face and an overhanging projection at the upper limit of said face for preventing upward springing of engaged blanks, said arms extending upwardly from the interceptor lugs so that the blanks will engage the interceptor lugs and be placed thereby, then cause the arms to swing forwardly and upwardly to permit the blanks to pass under the interceptor lugs, and said interceptor lugs being connected with the arms by upwardly breaking spring knee joints which permit the interceptor lugs to yield upwardly as the arms are swinging back to normal position when the blanks are passing under the interceptor lugs.

10. In apparatus of the character described, means for feeding can body blanks in a downwardly bowed position and in processional order comprising a pair of first feeder chains arranged in parallel spaced relation and having pusher lugs thereon in equidistantly spaced relation, means for placing the blanks on the first feeder chains in downwardly bowed position, means for holding the blanks in downwardly bowed position while they are being moved by said first feeder chains, a pair of second feeder chains arranged in parallel spaced relation and in position for receiving blanks from the first feeder chains, said second feeder chains also having pusher lugs thereon in equidistantly spaced relation, means including said second chain pusher lugs for holding the blanks in downwardly bowed position while they are being moved by said second feeder chains, a pair of third feeder chains arranged in parallel spaced relation and in position for receiving blanks from the second feeder chains, said third feeder chains also having pusher lugs thereon in equidistantly spaced relation, and means for driving said chain pairs with the second feeder chains moving at an accelerated rate with relation to the first feeder chains and the third feeder chains moving at an accelerated rate with relation to the second feeder chains so that the pusher lugs on the second and third feeder chains overtake and take over the feeding of the blanks from the lugs of the first and second feeder chains respectively and the lugs of said third feeder chain in removing the blanks from the lugs of the second feeder chain allow them to flatten out from their bowed position.

11. In apparatus of the character described, means for feeding can body blanks in a downwardly bowed position and in processional order comprising a pair of first feeder chains arranged in parallel spaced relation and having pusher lugs thereon in equidistantly spaced relation, means for placing the blanks on the first feeder chains in downwardly bowed position, means for holding the blanks in downwardly bowed position while they are being moved by said first feeder chains, a pair of second feeder chains arranged in parallel spaced relation and in position for receiving blanks from the first feeder chains, said second feeder chains also having pusher lugs thereon in equidistantly spaced relation, means including said pusher lugs for holding the blanks in downwardly bowed position while they are being moved by said second feeder chains, a pair of third feeder chains arranged in parallel spaced relation and in position for receiving blanks from the second feeder chains, said third feeder chains also having pusher lugs thereon in equidistantly spaced relation, and means for driving all said chain pairs including devices for connecting the first and second feeder chain pairs in drive relation adjustable for lining up the lugs on the first feeder chains and for timing them with the lugs on the second feeder chains, adjustable driver sprockets which may be adjusted to line up the lugs on the second feeder chains and those on the third feeder chains, and an adjustable driver sprocket which may be adjusted for timing the lugs of one of said second and third chain pairs with those on the other of said second and third chain pairs.

12. In apparatus of the character described, means for feeding can body blanks in a downwardly bowed position and in processional order comprising a pair of first feeder chains arranged in parallel spaced relation and having pusher lugs thereon in equidistantly spaced relation, means for placing the blanks on the first feeder chains in downwardly bowed position, means for holding the blanks in downwardly bowed position while they are being moved by said first feeder chains, a pair of second feeder chains arranged in parallel spaced relation and in position for receiving blanks from the first feeder chains, said second feeder chains also having pusher lugs thereon in equidistantly spaced relation, means including said pusher lugs for holding the blanks in downwardly bowed position while they are being moved by said second feeder chains, a pair of third feeder chains arranged in parallel spaced relation and in position for receiving blanks from the second feeder chains, said third feeder chains also having pusher lugs thereon in equidistantly spaced relation, and means for driving said chain pairs with the second feeder chains moving at an accelerated rate with relation to the first feeder chains and the third feeder chains moving at an accelerated rate with relation to the second feeder chains so that the pusher lugs on the second and third feeder chains overtake and take over the feeding of the blanks from the lugs of the first and second feeder chains respectively, and the lugs of said third feeder chain in removing the blanks from the lugs of the second feeder chain allow them to flatten out from their bowed position, said driving means also including devices for connecting the first and second feeder chain pairs in drive relation adjustable for lining up the lugs on the first feeder chains and for timing them with the lugs on the second feeder chains, adjustable driver sprockets which may be adjusted to line up the lugs on the second feeder chains and those on the third feeder chains, and an adjustable driver sprocket which may be adjusted for timing the lugs of one of said second and third chain pairs with those on the other of said second and third chain pairs.

13. In apparatus of the character described, means for supporting a stack of can body blanks, suction means for withdrawing the blanks one-by-one from the stack, an arched support plate and magnet means for receiving the blanks from the suction means and holding them in downwardly bowed relation with the longitudinally extending marginal edges directed laterally and downwardly, a first conveyor means continuously driven and effective to feed the body blanks in processional order away from the magnet means, holddown means cooperating with the plate in maintaining the bowed relation of the blanks as they are moved away from the magnets, a second conveyor means continuously driven at an accelerated rate relative to said first conveyor means and effective to take over the feeding of the blanks therefrom and having thereon driver lugs engageable with the blanks and including forwardly extending overhanging portions for overlying blanks being fed and holding them in the downwardly bowed relation, said second conveyor means and the driver lugs and overhanging portions thereof being spaced inwardly of said blank marginal edges, a central longitudinal support for the blanks as they are being conveyed by said second conveyor means and cooperating with said overhanging portions in maintaining the bowed relation of the blanks, and a third conveyor means continuously driven at an accelerated rate relative to said second conveyor means and effective to take over the feeding of the blanks therefrom.

14. In apparatus of the character described, means for feeding can body blanks in a downwardly bowed position and in processional order comprising a pair of first feeder chains arranged in parallel spaced relation and having pusher lugs thereon in equidistantly spaced relation, means for placing the blanks on the first feeder chains in downwardly bowed position, means for holding the blanks in downwardly bowed position while they are being moved by said first feeder chains, a pair of second feeder chains arranged in parallel spaced relation and in position for receiving blanks from the first feeder chains, said second feeder chains also having pusher lugs thereon in equidistantly spaced relation, means including said second chain pusher lugs for holding the blanks in downwardly bowed position while they are being moved by said second feeder chains, and means for driving said chain pairs with the second feeder chains moving at an accelerated rate with relation to the first feeder chains so that the pusher lugs on the second feeder chains overtake and take over the feeding of the blanks from the lugs of the first feeder chains.

15. Apparatus as defined in claim 14 wherein the second chain lugs include overhang elements engageable over the blanks as the second lugs are moving them, and there is included a support element along and over which the blanks are moved by the second chain lugs and which is disposed at a higher level than the overhang elements so as to cooperate therewith in holding the blanks in downwardly bowed position while they are being moved.

16. Apparatus as defined in claim 14 wherein the second chain lugs include overhang elements engageable over the blanks as the second lugs are moving them, and there is included a support element along and over which the blanks are moved by the second chain lugs and which is disposed at a higher level than the overhang elements so as to cooperate therewith in holding the blanks in downwardly bowed position while they are being moved, means also being included for tending to retard movement of the blanks as they are being contacted by the second chain lugs so as to cause trailing edge portions thereof to engage under and be held down by said overhang elements.

References Cited in the file of this patent

UNITED STATES PATENTS

| Number | Name | Date |
|---|---|---|
| 1,226,168 | Barber | May 15, 1917 |
| 1,636,876 | Swartz | July 26, 1927 |
| 1,640,693 | Couch | Aug. 30, 1927 |
| 1,689,756 | Swangren | Oct. 30, 1928 |
| 1,810,511 | Wolfinger | June 16, 1931 |
| 1,824,228 | Perry | Sept. 22, 1931 |
| 1,846,703 | Wiener | Feb. 23, 1932 |
| 1,885,892 | Bronander | Nov. 1, 1932 |
| 1,972,489 | Rideout | Sept. 4, 1934 |
| 2,059,546 | Brandenburg | Nov. 3, 1936 |
| 2,135,713 | Higgins | Nov. 8, 1938 |
| 2,184,100 | Mondloch | Dec. 19, 1939 |
| 2,204,207 | Coburn | June 11, 1940 |
| 2,252,585 | Swanson | Aug. 12, 1941 |
| 2,292,463 | Mill | Aug. 11, 1942 |
| 2,319,281 | Winters | May 18, 1943 |
| 2,362,677 | Stephens | Nov. 14, 1944 |
| 2,439,040 | Cohen | Apr. 6, 1948 |
| 2,450,669 | Kronquest | Oct. 5, 1948 |
| 2,471,802 | Walter | May 31, 1949 |
| 2,478,034 | Zademach | Aug. 2, 1949 |
| 2,623,233 | Maier | Dec. 30, 1952 |
| 2,626,800 | Martin | Jan. 27, 1953 |